United States Patent
Chenoweth

(10) Patent No.: US 7,922,839 B2
(45) Date of Patent: Apr. 12, 2011

(54) METHOD FOR BRAKE ROTOR ASSEMBLY AND MANUFACTURE

(75) Inventor: Michael Chenoweth, Sacramento, CA (US)

(73) Assignee: Miks Engineering, El Dorado Hils, CA (US)

( * ) Notice: Subject to any disclaimer, the term of this patent is extended or adjusted under 35 U.S.C. 154(b) by 0 days.

(21) Appl. No.: 12/245,514

(22) Filed: Oct. 3, 2008

(65) Prior Publication Data

US 2009/0090436 A1  Apr. 9, 2009

Related U.S. Application Data

(60) Provisional application No. 60/977,572, filed on Oct. 4, 2007.

(51) Int. Cl.
   *C21D 9/00* (2006.01)
(52) U.S. Cl. ........................................ 148/542
(58) Field of Classification Search .................. None
   See application file for complete search history.

(56) References Cited

U.S. PATENT DOCUMENTS

| | | |
|---|---|---|
| 5,992,587 A | 11/1999 | Maldonado |
| 6,505,716 B1 | 1/2003 | Daudi et al. |
| 6,655,508 B2 | 12/2003 | Ballinger et al. |
| 6,708,589 B2 | 3/2004 | Brinker et al. |
| 6,957,726 B2 | 10/2005 | Gehrs |
| 6,988,598 B2 | 1/2006 | Williams |
| 6,997,292 B2 | 2/2006 | Burgoon et al. |
| 7,219,777 B2 | 5/2007 | Lin |

*Primary Examiner* — Roy King
*Assistant Examiner* — Yoshitoshi Takeuchi
(74) *Attorney, Agent, or Firm* — Webb IP Law Group; Jason P. Webb; Danny Y. H. Cheng

(57) ABSTRACT

A method of assembly and manufacture of a brake rotor, comprising providing a brake rotor mold. The method also includes pouring brake rotor material into the brake rotor mold. Then the method includes rotating the brake rotor mold during hardening of the brake rotor material thereby forming a brake rotor. The method further includes removing an interior portion of the hardened brake rotor material of the brake rotor with a water jet cutting device. The water jet device shapes the brake rotor to a desired shape. The brake rotor is then heat and cryogenically treated.

12 Claims, 2 Drawing Sheets

METHOD FOR BRAKE ROTOR ASSEMBLY AND MANUFACTURE

CROSS-REFERENCE TO RELATED APPLICATIONS

This invention claims priority, under 35 U.S.C. §120, to the U.S. Provisional Patent Application No. 60/977,572 to Chenoweth, filed on Oct. 4, 2007, which is incorporated by reference herein.

BACKGROUND OF THE INVENTION

1. Field of the Invention

The present invention relates to methods for brake assembly and manufacturing, specifically to a method for brake rotor assembly and manufacturing.

2. Description of the Related Art

Brake rotors are a device for slowing or stopping the rotation of a wheel. A brake rotor is usually made of cast iron or ceramic composites including carbon, kevlar and silica. The brake rotor is connected to the wheel and/or the axle of a vehicle. To stop the wheel, friction material in the form of brake pads, mounted on a device called a brake caliper, is forced mechanically, hydraulically, pneumatically, or electromagnetically against both sides of the rotor. Friction causes the rotor and attached wheel to slow or stop.

Most stainless steel and other material in rotors are made of sheet stock or they are casted. Sheet rotors have a low-to-near-zero porosity as well as linear grain. The grain makes the material stronger. However, as the rotor temperature reaches the thermal transition temperature of the material, the rotor will expand and contract unevenly across the grain causing distortion or warp age. Casted rotors expand and contract evenly because they have no grain. However, casted rotors have a large number of pores that reduce the friction coefficient and reduce braking efficiency and performance. The casted rotors can become brittle if not processed properly and can literally break. Some improvements have been made in the field. Examples of references related to the present invention are described below, and the supported teachings of each reference are incorporated by reference herein:

U.S. Pat. No. 6,957,726, issued to Gehrs discloses a floating brake rotor assembly with non-load bearing pins includes a brake rotor and hub that are coplanar and are interconnected by pin and spring assemblies such that the pins do not bear rotational torque being transferred between the brake rotor and hub. The rotor has tooth-like protruding members along its inner edge that mate with recesses along the outer edge of the hub. When aligned, each protruding member and corresponding recess forms an aperture through which a pin is positioned, and allows for transfer of rotational torque without applying load force to the pin.

U.S. Pat. No. 5,992,587, issued to Maldonado discloses a motorcycle disk brake rotor in the shape of an annular ring is mounted to the motorcycles rear wheel at the outside of its annulus and swept by the yoke of a disk brake caliper that is mounted to the inside of the annulus. A belt pulley affixes at its exterior circumferential region—either rigidly or "floating"—the exterior annular region of the disk brake rotor which is in the shape of the annular ring. A motorcycle disk brake caliper assembly is anchored at one mounting point to the motorcycle's rear axle shaft, and at a second mounting point to the motorcycle's suspension swing arm, engages the disk brake rotor from the inside of its annulus. The combined disk brake and belt pulley assembly is compact and visually regularly appearing. It may suitably be stylized with the same pattern as are the wheels of the motorcycle. While providing both braking and motive drive functions, it is entirely located upon but one side of the motorcycle's rear wheel, making that the view of the other side of the wheel is unobstructed and aesthetically improved. It is suitably retrofitted to existing belt-drive motorcycles.

U.S. Pat. No. 6,997,292, issued to Burgoon et al. discloses a brake assembly for use on vehicles includes a rotor and a wheel mount, formed as a hat portion, fastened to the rotor with a bobbin assembly. The rotor has a flange formed as a series of spaced tabs, and the bobbin assembly is bolted to the hat portion with the rotor flange clamped there between. A spring clip can be used with the bobbin to accommodate thermal expansion of the rotor and eliminate rotor rattling. The bobbin has a binocular shape that receives a pair of bolts. A crush zone between the rotor and the bobbin yields to accommodate machining tolerances of the rotor and promote uniform torque transfer distribution to the hub. Torque is transferred from the brake rotor to the hat portion in a common plane to prevent twisting in the fastener connection.

U.S. Pat. No. 7,219,777, issued to Lin discloses a central mounting portion for mounting the brake rotor on a hub, a first annular braking surface and a second annular braking surface, where each braking surface includes an inner diameter and an outer diameter, a bridge provided between the central mounting portion and the inner diameter of at least one of the first and the annular braking surfaces and a plurality of ribs positioned proximate to the bridge.

U.S. Pat. No. 6,988,598, issued to Williams discloses a mounting system for disc brake rotors. Drive pins are mounted to a wheel hub. Alignment bushings having outer flanges defining a channel are slideably held in slots in a disc brake rotor, with the rotor engaging the bushing channel. The alignment bushings are each mounted on a drive pin inserted through a hole in the alignment bushing. Drag rings prevent unwanted movement between the alignment bushings and the drive pins. The drag rings can be mounted in grooves in the alignment bushings or, alternatively, in grooves on the drive pins. Retaining rings on the drive pins prevent the bushings from coming off of the drive pins.

U.S. Pat. No. 6,708,589, issued to Brinker et al. discloses a method for forming a brake assembly for a motor vehicle includes a wheel hub, a knuckle, and a brake rotor. The wheel hub includes a neck portion and a flange portion having a flange face. The flange face has a plurality of bolt receiving holes formed therein. The wheel hub is placed in rotational communication with the knuckle. The flange face of the wheel hub has a brake rotor secured thereto. The brake rotor has an inner surface, which is subjected to final finishing in order to reduce lateral run-out of the brake rotor.

U.S. Pat. No. 6,655,508, issued to Ballinger et al. discloses a disc brake including a pair of friction plates arranged coaxially in a parallel, spaced-apart relationship and a plurality of vanes extending between the pair of friction plates, each of said vanes having a proximal end, a distal end and a mid-portion extending between the proximal end and the distal end, the proximal ends of a plurality of the vanes having a first width, the mid-portion having a second width, the first width being substantially greater than the second width. The vanes can include a T-shaped portion adjacent the proximal end.

U.S. Pat. No. 6,505,716, issued to Daudi et al. discloses a brake rotor having improved damping characteristics and a method for producing the same. A surface of the brake rotor is EDG machined, also known as EDM machined, for improving the damping characteristics of the rotor. The decay rate of the brake rotor is increased and the Q factor of the brake rotor is reduced. The portion of the brake rotor which is EDG machined is formed of an electrically conductive material, preferably a ferrous material, more preferably a cast iron material, a gray iron material or a damped iron material. The brake rotor may include a solid friction section or a ventilated friction section. The brake rotor is preferably cast from a single material, although alternatively, it may be a composite rotor formed of more than one material.

The inventions heretofore known suffer from a number of disadvantages which include being expensive, uneven expansion, flaws and/or variations in characteristics and properties across the rotor, poor heat transfer, being flimsy, being non-durable, being limited in application, being limited in versatility, being limited in adaptability, and being unreliable.

What is needed is a method of brake rotor assembly and manufacture that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available methods of assembly and manufacture of brake rotors. Accordingly, the present invention has been developed to provide an efficient and reliable brake rotor.

A method of assembly and manufacture of a brake rotor may comprise providing a brake rotor mold. The method may also include pouring a brake rotor material into the brake rotor mold and rotating the brake rotor mold during hardening of the brake rotor material thereby forming a brake rotor. The method may further include removing an interior portion of the hardened brake rotor material of the brake rotor with a water jet cutting device. In addition to shaping the brake rotor to a desired shape with the water jet cutting device. The method also includes heat treating the brake rotor and cryogenically treating the brake rotor.

The method may comprise heat treating the rotor between a temperature range of 1600 to 2000 degrees Fahrenheit and for a duration of between about 2 hours and 6 hours. The method may also comprise cryogenically treating the rotor to a temperature of minus 317 degrees Fahrenheit and for a duration of seventy-two hours. In addition, the brake rotor mold is shaped to form a brake rotor that is generally toroidal and wherein the step of removing an interior portion includes cutting an annular interior portion from the brake rotor. The method may further comprise the step of not ever cutting the brake rotor with any device other than a water jet cutting device.

Reference throughout this specification to features, advantages, or similar language, does not imply that all of the features and advantages that may be realized with the present invention should be, or are, in any single embodiment of the invention. Rather, language referring to the features and advantages is understood to mean that a specific feature, advantage, or characteristic, described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics, of the invention may be combined in any suitable manner in one or more embodiments. One skilled in the relevant art will recognize that the invention can be practiced without one or more of the specific features, or advantages, of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. It is noted that the drawings of the invention are not to scale. The drawings are mere schematics representations not intended to portray specific parameters of the invention. Understanding that these drawings depict only typical embodiments of the invention and are not, therefore, to be considered to be limiting its scope, the invention will be described and explained with additional specificity and detail through the use of the accompanying drawings, in which.

DETAILED DESCRIPTION OF THE INVENTION

Figure 1:
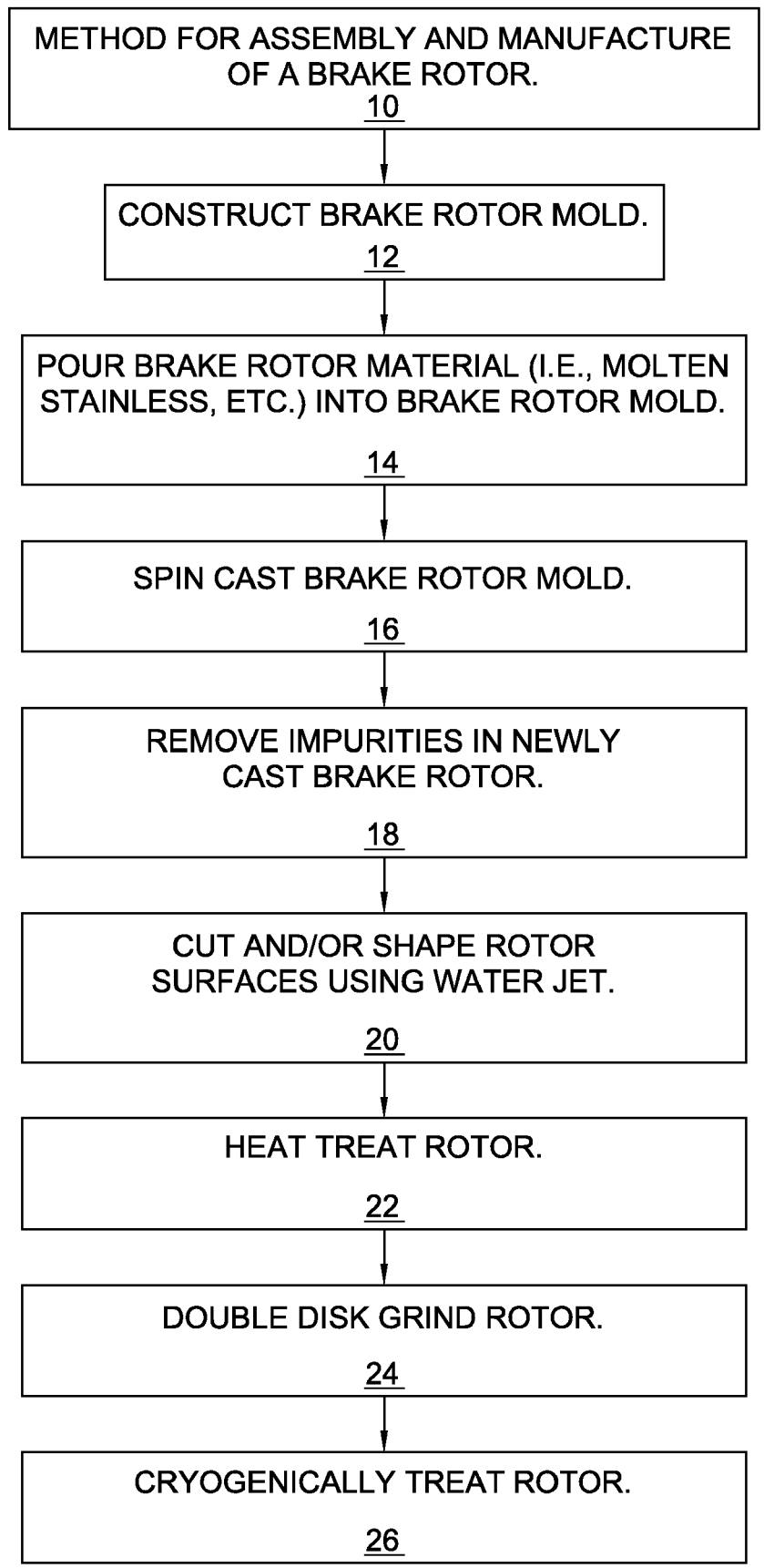
FIG. 1 is a flowchart of a method of brake rotor assembly and manufacture, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like, described herein are considered to be able to be combined in whole, or in part, one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Looking to the figures, there is a method of brake rotor assembly and manufacture 10, according to one embodiment of the invention, wherein the illustrated method 10 includes providing a brake rotor mold 12. One skilled in the art would appreciate that the brake rotor mold may vary in design, shape, and configuration and still perform its intended function. The method 10 also includes pouring a brake rotor material into the brake rotor mold 14. The method 10 further includes rotating the brake rotor mold 16, a method called spin casting, wherein the brake rotor is spun at a high rate, thereby forcing the denser brake rotor material to the exterior of the brake rotor and the less dense material to the interior of the brake rotor. The method 10 still further includes hardening of the brake rotor material thereby forming a brake rotor.

In addition, one skilled in the art would appreciate that the brake rotor mold may be configured to form a plurality of brake rotors, wherein the brake rotor mold may be configured to produce a three foot long pipe comprising of brake rotor material. The pipe may be cut into wafers wherein each wafer may be shaped into a brake rotor.

Figure 2:
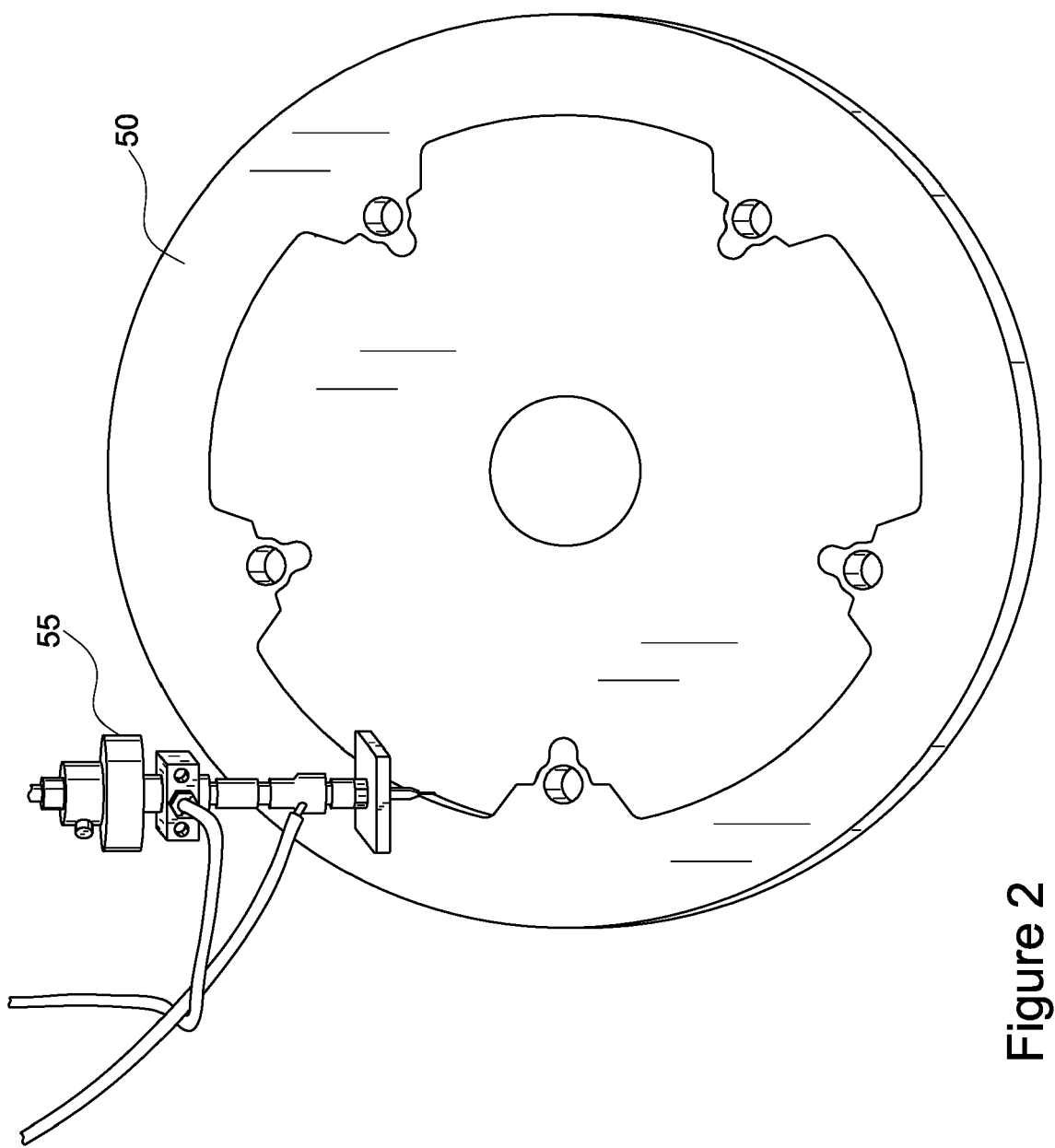
FIG. 2 is a perspective view of a water jet device cutting a brake rotor, according to one embodiment of the invention.

The illustrated method 10 additionally includes removing an interior portion of the hardened brake rotor material of the brake rotor 18 with a water jet cutting device 55 (see FIG. 2). Accordingly, the rotor mold must be configured to include an additional interior portion that is intended to be removed and may be sized greater than an expected amount of impurities. Removing the interior portion of the brake rotor removes the less dense impurities of the brake rotor material. In addition, removing the exterior portion of the brake rotor eliminates the more dense brake rotor material. Accordingly, the mold may be sized to allow for additional material to collect on an exterior portion intended to be removed. A non-limiting example of a water jet cutting device may be a Omax Jetmachining Center manufactured by Omax Corp. at 21409 $72^{nd}$ Ave. South, Kent, Wash., 98032. The method 10 further includes shaping the brake rotor to a desired shape with a water jet cutting device 20. The water jet cutting device shapes a rotor 50 (see FIG. 2), to a desired shape, design, or configuration. Advantageously, a water jet cutting device performs such without substantially altering characteristics of the brake rotor because the water jet cutting tool does not substantially increase the localized temperature at the cut location nor induce a substantial shear force along the portion to be cut. In one embodiment, the term water jet cutting device is intended to include other cutting tools, including those not yet in existence wherein the cutting tool does not substantially modify material surrounding the cut location.

The illustrated method 10 includes heat treating the rotor between about or substantially equal to any of 800, 1000, 1200, 1400, 1600, 1800, 2000, 2200, 2400, and 2600 degrees Fahrenheit and/or to a temperature or temperature range substantially similar to expected operating temperatures or expected temperature extremes of the rotor in use. Such may persist for a duration between 2 hours and 6 hours, greater than 2 hours, less than 6 hours, 4 hours, 3 to 5 hours, 4 to 6 hours, greater than 1 hour, long enough that greater than 50, 80, 90, 95, 99, or 100% of physical alterations producing surface irregularities are expected to be produced. Heat treatment duration may depending upon the composition of the brake rotor material and/or upon optimization testing based on batches of material. It is believed that heat treatment expands the brake rotor, thereby making the brake rotor less likely to break or warp during high temperature use.

A non-limiting example may be that the heat treatment processes the brake rotor material up to 2000 degrees Fahrenheit, wherein the heat treatment process converts most of the brake rotor material to a more stable and more resistant material to prevent damage, warpage, or breakage during operating temperatures. In the illustrated method 10, the brake rotor is then double disk grinded 24, or otherwise treated with surface abrasion. Accordingly, surface irregularities from the heat treatment and/or spin casting may be removed. The process continues to a cryogenic treatment process 26, wherein the cryogenic treatment neutralizes the stress introduced to the brake rotor during the double disk grinding process. In addition, the cryogenic treatment converts most of the rest of the brake rotor material to a more stable and more resistant material to prevent damage, warpage, or breakage, during operating temperatures.

The illustrated method 10 then includes cryogenically treating 26 the brake rotor. Such may be to a temperature of about, equal to, or lower than, minus 317 degrees Fahrenheit, or sufficiently low to modify characteristics of rotor material. Cryogenic treatment of a rotor may persist for a duration of between about or substantially equal to any of twelve, twenty-four, thirty-six, forty-eight, sixty, seventy-two, eighty-four, and ninety-six hours. The cryogenic treatment compresses the brake rotor, thereby making the brake rotor less likely to crack, chip or be damaged during use. The heat treatment 22 combined with the cryogenic treatment 26 cures the rotor, thereby creating a rotor that is less likely to expand, contract, and break during high and low temperatures of use.

In one embodiment of the invention, the illustrated method 10 involves pouring molten stainless steel into a rotating mold. The spinning action compresses the denser material into the outer ring leaving the lighter impurities in the center where they are later removed. The method 10 also creates a flow or radial grain in the final product giving us the strength the grain provides while at the same time retaining the even expansion and contraction of the casted product. Lastly, the method 10 retains a near zero porosity improving the friction coefficient and making for a more consistent and efficient braking surface.

FIG. 1 is a flowchart illustrating a method for assembling and/or manufacturing a brake rotor 10. As shown the method includes constructing, making and/or forming a brake rotor mold 12. The rotor surface is manufactured from a centrifugally cast 420 SS, spin casting. The combination of a radial grain and zero porosity increases contact surface as well as strengthens and promotes resistance to warp age. Also shown in FIG. 1, the method 10 includes pouring and/or filling the mold with brake rotor material. The brake rotor material may be any type of material contemplated in the art, such as but not limited to steel, iron, metal alloys, etc. In a non-limiting example, the brake rotor comprises SS 420 (stainless steel grade 420). Using the material SS 420, while not commonly used and not the most cost efficient material, the SS420 provides the best material for use with the spin casting process, as there is increased ability to remove the impurities and the SS420 is more suitable for the spin casting process. Iron is the common material used in brake rotors, however, the SS 420 as previously disclosed in better suited for the spin casting process.

As shown in FIG. 1, the method includes spin casting, or centrifugal rubber mold casting the brake rotor material in the mold. Advantageously, in one embodiment, the spin casting process, as applied to the formation of the brake rotor compresses the denser materials into the outer ring and leaves the lighter impurities near the center. These impurities are then removed from the mold, as shown in FIG. 2. The spin casting process additionally creates a flow or radial grain in the final brake rotor. The flow or radial grain provides strength while retaining the casting characteristics of the brake rotor.

In one embodiment of the invention, the impurities are removed after the spin casting process is complete. The impurities may be removed after the casting process is completed the impurities, which are mostly, if not all, disposed now in the center portion of the rotor are removed through a water jet cutting device. In an additional embodiment, the center portion of the brake rotor is removed via the water jet cutting device. Advantageously, the method may include shaping, forming, and/or cutting the brake rotor to any shape desirable. In a preferred embodiment, the center portion of the cast brake rotor is removed, along with the impurities therein. Advantageously, the water jet cutting does not introduce heat into the material. This is in contrast to the current methods of milling or laser cutting, which both introduce an excess of heat into the rotor material which may cause a condition know as work hardening. These components then are prone to fractures and warp age while in use. Additionally, water jet cutting enables the rotor material to be shaped and formed in any manner desired, these shapes if cut with conventional methods that substantially alter material surrounding cut portions may result in failures and/or breakage of the part.

In another embodiment, removing the impurities is desirable, as the impurities that are present while either preheating the brake rotor during use may cause warping, bubbling, and/or other serious damage to the rotor. Impurities may additionally impose varying critical temperature points throughout the rotor. Removing the impurities thereof enable the rotor surface to be of a uniform material.

Also shown in FIG. 1, the method includes heat treating the newly formed rotor. The heat treating may be accomplished in any manner contemplated in the art or as described herein, or such as described in U.S. Pat. Nos. 6,972,058 and 6,210,500 which are incorporated by reference herein for their supportive teachings. In one non-limiting example, the brake rotor is heat treated two hundred (200) degrees hotter than what is commonly known in the art. Heat treating the rotor surface at such high temperatures assists in reducing pores in the material and making the rotor much stronger.

Additionally, as illustrated in FIG. 1, the method includes grinding and/or shaping the rotors to a desired thickness. In one non-limiting example, the grinding of the rotors is accomplished via a double disk grinding process and/or machine, as taught in U.S. Pat. No. 6,485,357, which is incorporated by reference herein for its supportive teachings.

Also, in one embodiment, the method includes treating the newly ground rotors with extreme cold temperatures. In one embodiment, the method includes cryogenically treating the rotors for a period of time. In a non-limiting example, the period of time includes about 3 days. In being about three (3) days the period of time may be 3 full days (72 hours), between 60-78 hours, or between 68-72 hours. The period of time may vary; however, the period of time may be sufficient such that heating and thermal effects imparted into the rotors by virtue of the grinding process are substantially neutralized. In being substantially neutralized the heating and thermal effects need not be completed neutralized. In another embodiment, the cryogenic treatment of the rotors includes features, elements, and/or processes as taught in U.S. Pat. No. 5,259,200 which is incorporated by reference herein for its supportive teachings. The temperatures of the treatment may range from −185 degrees to −320 degrees F.

Advantageously, the cryogenic treatment of the rotors tempers any matrix material on a molecular level. This reduces the potential for stress on the rotor and rotor material, reduces the potential for stress induced distortion, improves resistance to wear and tear on the rotor, and resistance to warp age of the rotor.

In one embodiment, the structure of the rotor assembly advantageously strengthens the lateral coupling of the rotor surface and the carrier portion. In a non-limiting example, after a motorcycle accident, in many instances, a motor bike will fall on its side, thereby crushing and potentially damaging a break rotor, carrier and/or assembly. This may cause the coupling between the carrier and the rotor surface to become loosened which can be dangerous for subsequent use. Advantageously, in one embodiment of the invention, the structure of the rotor assembly increases the strength of the coupling thereby preventing loosening upon wrecking a motorbike.

Many of the current brake rotors, such as those taught in U.S. Pat. No. 6,957,726 ('726) teach a design wherein a concave surface is required on both the carrier and rotor to act as an aperture to receive the retainer. Additionally, the current designs, as seen in '726, require that both the carrier and rotor have a precisely machined bearing surface to receive the retainer. This can substantially increase the cost and time of manufacturing and/or assembling the rotors. Further, in many instances, the current rotor assemblies limit the amount of surface area that can be used as a thrust face. The rivet pocket or cavity created between the rotor and carrier may further limit the amount of effective surface area that can be used as a thrust surface.

In contrast to the current systems and designs, in one embodiment of the present invention, the brake rotor assembly has the retainer completely imbedded in either the carrier or the rotor surface. In one embodiment, the retainer is imbedded in either the rotor surface or the carrier portion via a swaging process. Here, the retainer system is swaged into the rotor surface or carrier portion as taught in the art, such as, but not limited to, U.S. Pat. Nos. 7,252,808 and 7,195,438 which are incorporated by reference herein for their supportive teachings. In an alternative embodiment, the retainer system may be slid smoothly as part of either the rotor surface or carrier portion. Advantageously this process does not affect the performance of the rotor surface while allowing for easy and quick manufacture with less machine time.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Additionally, although the figures illustrate one shape of a rotor, it is contemplated there may be a variety of shapes, designs, colors, configurations, and/or other features included in the method and still perform its intended function.

It is also envisioned that the rotor surface may be cut, or shaped, in a variety of designs, configurations, shapes, lengths, widths, and still perform its intended function.

It is further envisioned that one skilled in the art would appreciate that the water cutting process may be any process that doesn't introduce heat to the material, thereby not altering the material that has been converted to a more stable and more resistant product by the heat treatment, double disk grinding, and the cryogenic treatment processes.

It is expected that there could be numerous variations of the design of this invention. An example is that the rotor may be specifically designed for a particular type of vehicle. Non-limiting examples may be a motorcycle, a sedan, a sports utility vehicle, semi truck, a dump truck, etc. and still perform its intended function. In addition, the rotor may be specifically heated and cryogenically treated for a particular type of vehicle and use of the vehicle. One non-limiting example may be a racing motorcycle, wherein the rotor for a racing motorcycle experiences extreme temperatures and conditions during use.

Finally, it is envisioned that the components of the device may be constructed of a variety of materials, such as, but not limited to, metals, metal alloys, steel, stainless, steel, iron, plastics, polyurethane, and/or so forth.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use, may be made, without departing from the principles and concepts of the invention as set forth in the claims. Further, it is contemplated that an embodiment may be limited to, consist of, or to consist essentially, of one or more of the features, functions, structures, or methods described herein.

What is claimed is:

1. A method of assembly and manufacture of a brake rotor, comprising:
    a) providing a brake rotor mold;
    b) pouring brake rotor material into the brake rotor mold;
    c) rotating the brake rotor mold during hardening of the brake rotor material thereby forming a brake rotor;
    d) removing an interior portion of the hardened brake rotor material of the brake rotor with a water jet cutting device;
    e) shaping the brake rotor to a desired shape with a water jet cutting device;
    f) heat treating the brake rotor; and
    g) cryogenically treating the brake rotor.

2. The method of claim 1, wherein the heat treating is between a temperature range of 1600 to 2000 degrees Fahrenheit and for a duration of between about 2 hours and 6 hours.

3. The method of claim 1, wherein the cryogenically treating includes treating the rotor to a temperature of minus 317 degrees Fahrenheit and for a duration of seventy-two hours.

4. The method of claim 1, wherein the brake rotor mold is shaped to form a brake rotor that is generally toroidal and wherein the step of removing an interior portion includes cutting an annular interior portion from the brake rotor.

5. The method of claim 1, further comprising the step of not ever cutting the brake rotor with any device other than a water jet cutting device.

6. The method of claim 1, wherein the rotating step includes rotating the mold at a rate configured to remove the impurities.

7. A method of assembly and manufacture of a brake rotor, wherein the order of the steps is as follows:
    first, providing a brake rotor mold;
    second, pouring brake rotor material into the brake rotor mold;
    third, rotating the brake rotor mold during hardening of the brake rotor material thereby forming a brake rotor;
    fourth, removing an interior portion of the hardened brake rotor material of the brake rotor with a water jet cutting device;
    fifth, shaping the brake rotor to a desired shape with a water jet cutting device;
    sixth, heat treating the brake rotor; and
    seventh, cryogenically treating the brake rotor.

8. The method of claim 7, wherein the heat treating is between a temperature range of 1600 to 2000 degrees Fahrenheit and for a duration of between about 2 hours and 6 hours.

9. The method of claim 7, wherein the cryogenically treating includes treating the rotor to a temperature of minus 317 degrees Fahrenheit and for a duration of seventy-two hours.

10. The method of claim 7, wherein the brake rotor mold is shaped to form a brake rotor that is generally toroidal and wherein the step of removing an interior portion includes cutting an annular interior portion from the brake rotor.

11. The method of claim 7, further comprising the step of not ever cutting the brake rotor with any device other than a water jet cutting device.

12. The method of claim 7, wherein the rotating step includes rotating the mold at a rate configured to remove the impurities.

* * * * *